Apr. 24, 1923.

G. T. HEMSLEY

CAM FOR GILL BOXES

Filed Nov. 17, 1922

1,453,010

George T. Hemsley
BY _____ INVENTOR
Gardner W. Pearson
_____ ATTORNEY.

Patented Apr. 24, 1923.

1,453,010

UNITED STATES PATENT OFFICE.

GEORGE T. HEMSLEY, OF LAWRENCE, MASSACHUSETTS.

CAM FOR GILL BOXES.

Application filed November 17, 1922. Serial No. 601,660.

*To all whom it may concern:*

Be it known that I, GEORGE T. HEMSLEY, a citizen of Great Britain, residing at Lawrence, in the county of Essex and State of Massachusetts, have invented certain new and useful Improvements in Cams for Gill Boxes, of which the following is a specification.

This invention relates to gill-boxes and, particularly, to the cams or mechanism associated with the bottom screws for lifting the fallers to the top screws by which they are carried forward with the stock.

The screw and lifting cam must both be made very accurately and carefully adjusted one to the other in order to function properly and reduce wear to a minimum. If the parts are not properly made and coordinated, a jam occurs whereby the fallers and other parts are broken, thus doing serious injury to the machine.

Besides the necessity of avoiding breaks, there are certain parts, such as the cam toes, which wear out before the other parts, and it is highly desirable to be able to replace these without entirely taking apart the machine, thereby reducing production and adding to the cost.

The cam disc with cam toes has been, and can be made integral with the screw shaft and screw, or the cam toes can be carried by arms attached to the shaft with no disc. This method is undesirable, however, because the fallers sometimes slip back of the cams and lock the whole box.

Generally, there is used a cam disc with cam toes integral therewith and having a central bore which allows it to be passed over a hub on the screw shaft to which it is keyed. When the cam toes wear, however, it is necessary to take down the whole machine and to remove the screw shafts in order to get off the cams, and this is expensive and takes time.

Another method shown by Hedrick in his Patent No. 1,418,568, June 6, 1922, is to use a split disc on each half of which is a cam toe. Each half has a threaded shoulder upon which are screwed suitable nuts which bind it on to a squared portion of the screw shaft. This can be removed without removing the screws, but there is a tendency for the two parts to separate next the end of the screws whereby fibre gets in between, and other difficulties occur.

This invention includes a disc-shaped cam plate which may be of one piece or two pieces, fixed either permanently or removably to the screw shaft, in association with cam toes which are detachable from the cam plate.

In the drawings, Figure 1 is a side elevation showing a bottom screw shaft and screw, with a built-up cam of my construction in position, shown in section.

Figure 1:
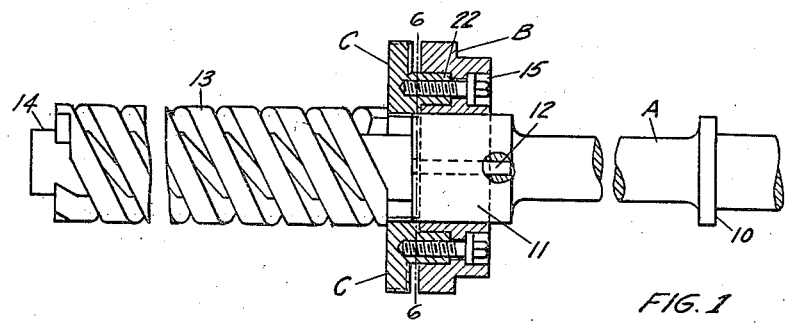

In the drawings, A represents the screw shaft of the lower screw of a gill-box. It has the usual annular flange 10 and end bearing 14, together with the screw threads 13 and the barrel 11 upon which a cam of the usual type, having a disc and toes integral, may be attached by means of a key 12, or my disc-shaped cam plate B can be attached in the same manner.

Figure 2:
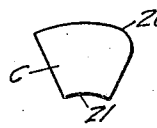
Fig. 2 is a front elevation as from the left of Fig. 1 of a cam toe.
Figure 3:
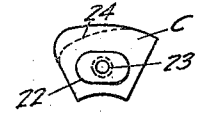
Fig. 3 is an elevation from the other side of this cam toe.
Figure 6:
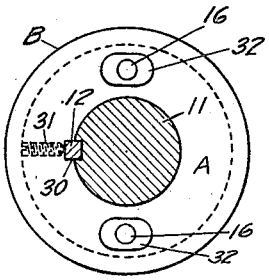
Fig. 6 is a view as from the left of line 6—6 Fig. 1 of the disc-shaped cam plate with the cam toes removed.

My preferred form of cam plate B has on the front, or as looked at from the left of Fig. 1, the two non-circular recesses 32, 32 which are each fitted to receive an arm, such as 22, of a cam toe C. Each cam toe C is shown in Figs. 2 and 3 as cut away at 21 to fit barrel 11 or to just clear it, and as having a wearing surface 20. As shown by the dotted line 24 in Fig. 3, this wearing surface gradually wears down until the cam toe must be replaced.

The cam toe arm 22 is tapped with a threaded hole 23 which, when the arm is in place in recess 32, registers with screw hole 16 therein whereby the attaching screw 25 can hold the parts detachably together.

Preferably, this screw 25 has a head 26 and a squared turning shank 27 which are countersunk in the recess 15.

It is obvious that when a cam toe, such as C, becomes worn, it is necessary only to remove the screw 25 to remove the cam toe and replace it with a new one, which is a very simple and inexpensive operation.

Figure 7:
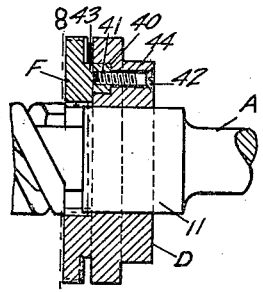
Figure 7 is an elevation, partly in section, of a cam of a well known construction wherein the cam toes are integral with the disc, with one of my devices attached thereto.
Figure 4:
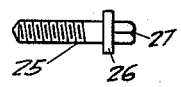
Fig. 4 is a side elevation, and Fig. 5 an end elevation, of the attaching screw for the cam toe.
Figure 5:
Figure 8:
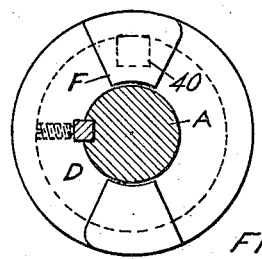
Fig. 8 is a sectional view from the left of Fig. 7 on line 8—8.

In Figs. 7 and 8, I show how I can utilize a well known type of cam D which includes a plate and toes made of one piece of metal. In this case, I have cut off the top cam toe and made a squared recess 40 in the disc and have drilled a hole 44 into said disc to receive the flat headed screw 42 which passes through into screw hole 41 in the arm 43 of cam toe F. In this way I can utilize this part of worn out cams and thereafter can readily replace cam toes as they wear out.

Figure 9:
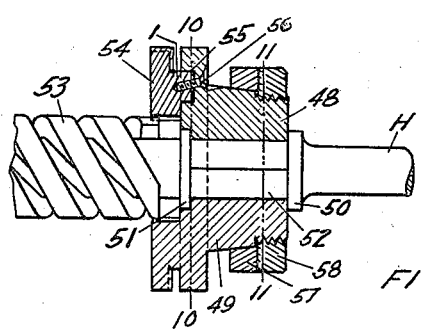
Fig. 9 is an elevation, partly in section, showing a cam of the type shown in patent to Hedrick, No. 1,418,568, June 6, 1922, with one of its cam carrying members equipped with my detachable cam toe, the other one not being so equipped.
Figure 10:
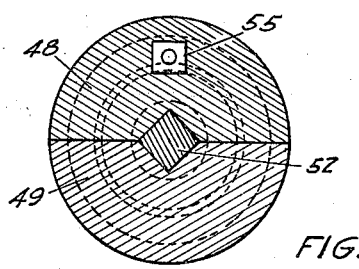
Fig. 10 is a sectional elevation from the left on line 10—10 of Fig. 9 before my cam toe is attached.
Figure 11:
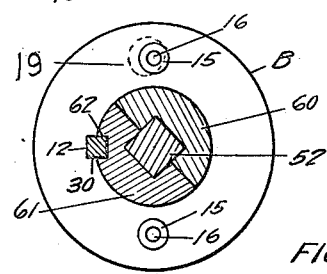
Fig. 11 is a sectional elevation as from the right of line 11—11 of Fig. 9, showing another method of applying my cam assembly to a shaft such as shown by Hedrick.

In Fig. 9, I show a screw shaft H with a screw 53 which has a squared portion 52 between the annular flanges 50 and 51 to receive the two sections 48 and 49 of a Hedrick cam held together by the tapered sleeve 57 and lock nut 58.

In this case, I have shown on one section 48 the original cam toe cut off and a recess 55 cut therein to receive the arm 1 of cam toe 54 which can then be held in place from the back by a screw 56.

Another way of attaching my device to the Hedrick construction is to do away with his cam sections entirely and to use two sections of bushing 60 and 61, the outside of which corresponds in size to barrel 11, and to attach thereto one of my regular disc-shaped cam plates B having a keyway 30 by means of a key 12, one half bushing 61 having a keyway 62 to cooperate therewith.

This cam plate B has countersunk screw holes 15 for the head and 16 for the shank of cam toe attaching screws 25, and on the face a non-circular recess, such as 32, or an off-centre or eccentric recess, such as shown by the dotted line 19, for the reception of the cam toe arm.

I claim:

1. In a faller operating mechanism for a gill-box, the combination of a screw shaft, with a disc shaped cam plate fixed thereon, said cam plate having a face with a non-circular recess therein, a cam toe detachable from said cam plate having a wearing edge and an arm which fits into said recess, and a countersunk screw which passes through said cam plate from the back into said cam toe arm.

2. In a faller operating mechanism for a gill-box, the combination of a cam plate having a face with a recess therein, a countersunk screw head recess in the back, a screw hole connecting said recesses, with a cam toe having an arm which fits in said face recess and a screw hole which registers with the cam face screw hole, and an attaching screw connecting said cam toe and cam plate with its head in said countersunk screw hole.

3. In a faller operating mechanism for a gill-box, the combination of a double threaded screw shaft, with a disc shaped cam plate fixed thereon, said cam plate having a face with two recesses therein, cam toes each detachable from said cam plate and each having a wearing edge together with an arm which fits into one of said cam plate recesses, and means to hold the cam toe arm in the cam plate recess.

GEORGE T. HEMSLEY.